(12) United States Patent
Kidokoro

(10) Patent No.: US 7,172,047 B2
(45) Date of Patent: Feb. 6, 2007

(54) SEAT BRAKE APPARATUS

(75) Inventor: Hiroyuki Kidokoro, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 438 days.

(21) Appl. No.: 10/762,035

(22) Filed: Jan. 20, 2004

(65) Prior Publication Data

US 2004/0188192 A1    Sep. 30, 2004

(30) Foreign Application Priority Data

Mar. 26, 2003 (JP) ............................. 2003-086051

(51) Int. Cl.
B60K 28/00 (2006.01)
(52) U.S. Cl. ................. 180/273; 188/174; 297/300.4
(58) Field of Classification Search ............... 180/273; 188/109, 167, 174; 297/300.4
See application file for complete search history.

(56) References Cited

U.S. PATENT DOCUMENTS 3,664,454 A * 5/1972 Cottrell ................. 180/273
3,787,086 A * 1/1974 Cosby ................. 296/65.07
4,076,302 A * 2/1978 Sable ................. 296/65.06
4,238,008 A * 12/1980 Higgins et al. ............. 180/328
4,262,958 A * 4/1981 Houseman et al. ....... 293/65.07
4,320,819 A * 3/1982 Erker ........................ 188/109
4,359,121 A * 11/1982 Messner et al. ......... 180/69.21
5,350,036 A * 9/1994 Shima ....................... 180/273

FOREIGN PATENT DOCUMENTS

| JP | 1-089265 | 6/1989 |
| JP | 7-228227 | 8/1995 |
| JP | 2000-203397 | 7/2000 |

* cited by examiner

Primary Examiner—Paul N. Dickson
Assistant Examiner—Toan C. To
(74) Attorney, Agent, or Firm—Morgan & Finnegan, L.L.P.

(57) ABSTRACT

A seat brake apparatus having a small number of components. A pivot member connected to a seat is pivotally supported by a front plate of the battery compartment. A contact plate is connected to the front plate. A torsion spring supported by the front plate has a first end portion contacting the pivot member and a second end portion contacting the contact plate.

14 Claims, 2 Drawing Sheets

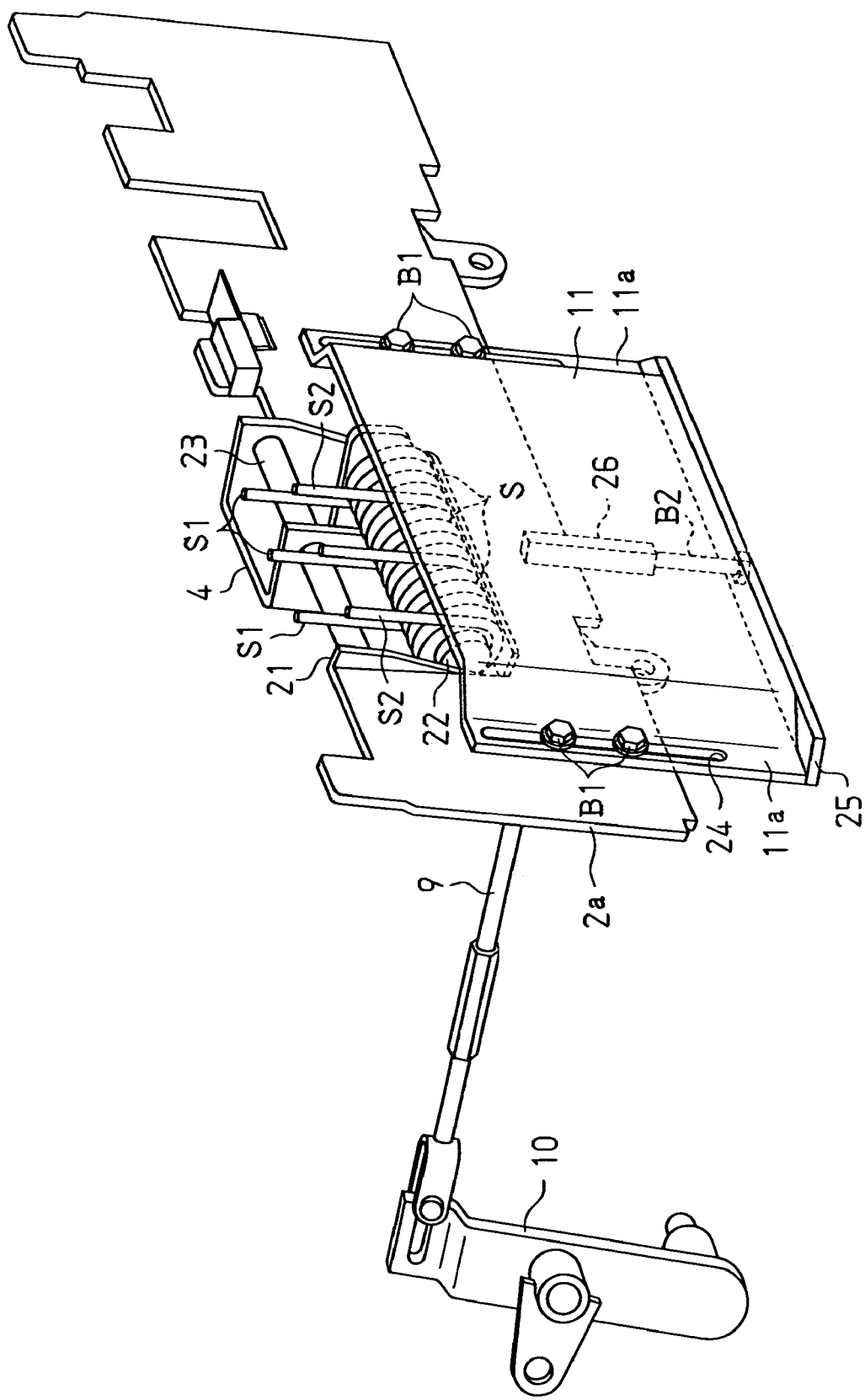

SEAT BRAKE APPARATUS

BACKGROUND OF THE INVENTION

The present invention relates to a seat brake apparatus for an industrial vehicle.

A typical industrial vehicle, such as a forklift, has a seat brake apparatus that automatically activates a brake when its operator is not seated on the operator seat. Japanese Laid-Open Patent Publication No. 2000-203397 describes an industrial vehicle equipped with a prior art seat brake apparatus. The seat brake apparatus includes a swing arm that is connected to a hood, which covers a battery compartment. The hood pivotally supports the swing arm in the forward and rearward directions of the industrial vehicle. A seat is arranged on the swing arm. The swing arm is connected to a link mechanism, which is arranged in the battery compartment. A spring, which activates the link mechanism, constantly urges the swing arm forward. When the operator gets off the seat, or when the weight of the operator is removed from the seat, the urging force of the spring pivots the arm and the seat forward. This activates a parking brake.

The urging force of the spring moves the link mechanism in the lateral direction of the industrial vehicle. However, the link mechanism must convert the lateral movement to the pivoting movement of the arm in the forward and rearward directions of the industrial vehicle. This results in an increased number of components and a complicated structure. Thus, the assembling of the link mechanism is difficult and takes time. Further, the link mechanism occupies a relatively large space in the battery compartment. This restricts the size, shape, and location of the battery.

SUMMARY OF THE INVENTION

It is an object of the present invention to provide an industrial vehicle with a seat brake apparatus having a simple structure.

To achieve the above object, the present invention provides a seat brake apparatus for use in a vehicle having a seat, a brake device, and a battery compartment. The seat is arranged above the battery compartment and the brake device is activated when the seat is released from the weight of an operator. The apparatus includes a pivot member arranged adjacent to the battery compartment to pivotally support the seat. A contact plate faces towards the pivot member. A torsion spring urges the pivot member away from the contact plate. The torsion spring is arranged between the pivot member and the contact plate and has a first end portion that contacts the pivot member and a second end portion that contacts the contact plate.

A further aspect of the present invention is a seat brake apparatus for use in a vehicle having an operator seat, a parking brake device, and a battery compartment. The operator seat is arranged above the battery compartment and the parking brake device is activated when the seat is released from the weight of an operator. The apparatus includes a front plate arranged adjacent to the battery compartment. A support arm supports the seat. A pivot arm has a basal portion pivotally connected to the front plate and a distal portion connected to the support arm. A contact plate is connected to the front plate facing towards the pivot arm. A torsion spring is arranged between the contact plate and the distal portion of the pivot arm and the pivot member to urge the pivot member away from the front plate when the seat is released from the weight of the operator.

A still further aspect of the present invention is an industrial vehicle having a brake device, a battery compartment, and a seat arranged above the battery compartment. A seat brake apparatus is provided between the seat and the battery compartment and activates the brake device when the seat is released from the weight of an operator. The seat brake apparatus includes a pivot member arranged adjacent to the battery compartment to pivotally support the seat. A contact plate faces towards the pivot member. A torsion spring urges the pivot member away from the contact plate. The torsion spring is arranged between the pivot member and the contact plate and has a first end portion that contacts the pivot member and a second end portion that contacts the contact plate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a partial perspective view showing the seat brake apparatus of FIG. 2.

DETAILED DESCRIPTION OF THE PREFERRED EMBODIMENT

A forklift equipped with a seat brake apparatus according to a preferred embodiment of the present invention will now be discussed.

Figure 1:
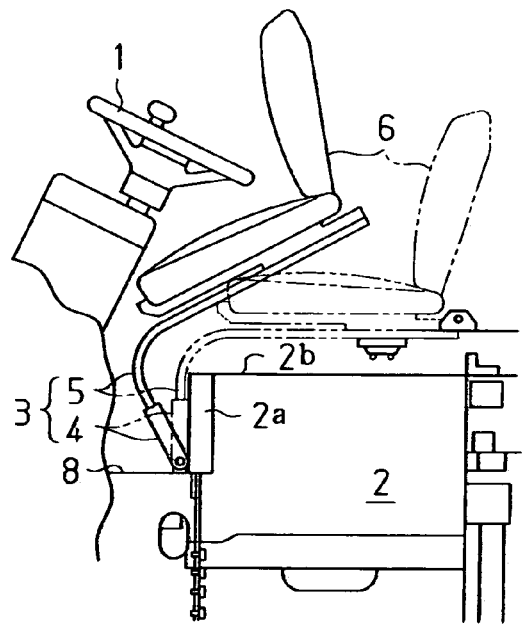
FIG. 1 is a side view showing an industrial vehicle having a seat brake apparatus according to a preferred embodiment of the present invention.

Referring to FIG. 1, the battery compartment 2 is located under the seat 6 rearward from the steering wheel 1. The battery compartment 2 is defined by a front plate (side plate) 2a and a cover plate 2b. A pivot member 3 is connected to the front plate 2a pivotally in the forward and rearward directions. The pivot member 3 includes a pivot arm 4 and a support arm 5. The pivot arm 4 has a basal end pivotally connected to the front plate 2a and a distal end connected to the support arm 5. As shown by the broken lines in FIG. 1, the support arm 5 is bent so that it extends along the front plate 2a and the cover plate 2b. The seat 6 is fixed to the support arm 5. Pivoting of the pivot member 3 moves the seat 6.

The seat brake apparatus will now be discussed with reference to FIG. 2. The seat brake apparatus has a connecting arm 7 fixed to the basal portion of the pivot arm 4. The connecting arm 7 is pivoted with the pivot arm 4. A link 10 is connected to an operation lever of a parking brake apparatus under a deck 8 of the forklift.

A contact plate 11 facing towards the pivot arm 4 is fixed to the front plate 2a. Torsion springs S are arranged between the contact plate 11 and the pivot arm 4. Each torsion spring S has a first end portion S1 pressed against the pivot arm 4 and a second end portion S2 pressed against the contact plate 11.

When the seat 6 is in the state shown by the broken lines in FIG. 1, that is, when the distance between the pivot arm 4 and the contact plate 11 is small, the compressed torsion springs S elastically urge the pivot arm 4 away from the contact plate 11. As long as the operator is sitting on the seat 6, the weight of the operator is applied to the seat 6 and the pivot member 3 (pivot arm 4). Thus, the pivot member 3 is not pivoted regardless of the force of the torsion springs S.

When the operator gets off the seat 6, the seat 6 is released from the weight of the operator. This results in the urging force of the torsion spring S pivoting the pivot member 3 forward. The connecting arm 7 is pivoted in cooperation with the forward pivoting of the pivot member 3. This drives the link 10 with the connecting rod 9 and activates a parking brake device. Accordingly, when the operator gets off the seat, the seat 6 is pivoted toward the front of the battery compartment 2 to activate the parking brake.

Referring to FIG. 3, the front plate 2a has a spring holder 21. The spring holder 21 receives three torsion springs S. A support shaft 22, which is attached to the spring holder 21, extends through the three torsion springs S.

The pivot arm 4 has a U-shaped cross section with two opposed reinforcing plates facing towards each other. The reinforcing plates reinforce the pivot arm 4. An activation bar 23 extends through the two reinforcing plates. Each torsion spring S has a first end portion S1 contacting the activation bar 23 and a second end portion S2 contacting the contact plate 11. The activation bar 23 is parallel to the coil portion that extends between the first and second end portions S1 and S2 of each torsion spring S.

Two guides 11a extend laterally from the contact plate 11. An elongated hole 24 extends vertically in each guide 11a. Two bolts B1 are inserted through each elongated hole 24. Each bolt B1 is fastened to the front plate 2a. When the bolts B1 are loosened, vertical movement of the contact plate 11 along the elongated holes 24 is enabled to adjust the position of the contact plate 11 relative to the front plate 2a. When the bolts B1 are fastened, the contact plate 11 is fixed to the side plate 2a. The bolts B1 and the elongated holes 24 serve as a guiding mechanism for guiding the movement of the contact plate 11 relative to the front plate 2a.

A lower plate 25 is arranged at the lower end of the contact plate 11. A hole extends through the middle of the lower plate 25. A position adjustment bolt B2 is inserted through the hole from the lower side of the lower plate 25. The position adjustment bolt B2 is engaged with a female thread member 26, which is fixed to the front plate 2a. In a state in which the bolts B1 are slightly loosened, the position adjustment bolt B2 is rotated in the fastening direction to move the lower plate (contact plate 11) upward. The position adjustment bolt B2 and the female thread member 26 function as a moving mechanism for moving the contact plate 11 relatively to the front plate 2a.

The operation of the seat brake apparatus will now be discussed.

The pivot member 3 (pivot arm 4) is first pivoted to the position shown by the solid line in FIG. 1. The contact plate 11 is moved to the lowermost position. In this state the torsion springs S are in an expanded state. In this state, the end portions S1 and S2 of each torsion spring S are spread, the first end portions S1 contact the activation bar 23, and the second end portions S2 contact the upper edge of the contact plate 11.

When the bolts B1 are slightly loosened and the position adjustment bolt B2 is rotated in the tightening direction, the contact plate 11 moves upward along the front plate 2a guided by the bolts B1 and the elongated holes 24. This presses the second end portions S2 of the torsion springs S toward the first end portions S1, which are adjacent to the activation bar 23, with the contact plate 11. The contact plate 11 is moved until the second end portions S2 of the torsion springs S are extended upwards along the contact plate 11. The bolts B1 are then fastened. This fixes the contact plate 11 to the front plate 2a and sets the three torsion springs S between the contact plate 11 and the pivot member 3 (activation bar 23).

When the operator pivots the pivot member 3 to the position shown by the broken lines in FIG. 1 and sits on the seat 6, the torsion springs S are elastically compressed. The compressed torsion springs S have an urging force that pivots the pivot member 3 forward. When the operator gets off the seat 6, the seat 6 is released from the weight of the operator. As a result, the urging force of the torsion springs S pivots the pivot member 3 forward. Forward pivoting of the pivot member 3 drives the link 10 with the connecting arm 7 and the connecting rod 9 to activate the parking brake device.

The contact plate 11 is arranged facing towards the activation bar 23 of the pivot arm 4, and the torsion springs S are arranged between the activation bar 23 and the contact plate 11. With such simple structure, the seat brake apparatus of the preferred embodiment activates the parking brake when the operator gets off the seat 6.

The number of components used in the seat brake apparatus of the preferred embodiment is less than that of a conventional seat brake apparatus. This reduces the number of assembling processes. Further, the seat brake apparatus of the preferred embodiment is relatively compact and does not occupy a large amount of space in the battery compartment 2. Thus, the battery compartment 2 may be used effectively.

The upward movement of the contact plate 11 properly sets the torsion springs S between the activation bar 23 and the contact plate 11. Accordingly, the torsion springs S are easily attached to the seat brake apparatus in a compressed state. Further, special tools for installing the torsions springs S are not needed.

Figure 2:
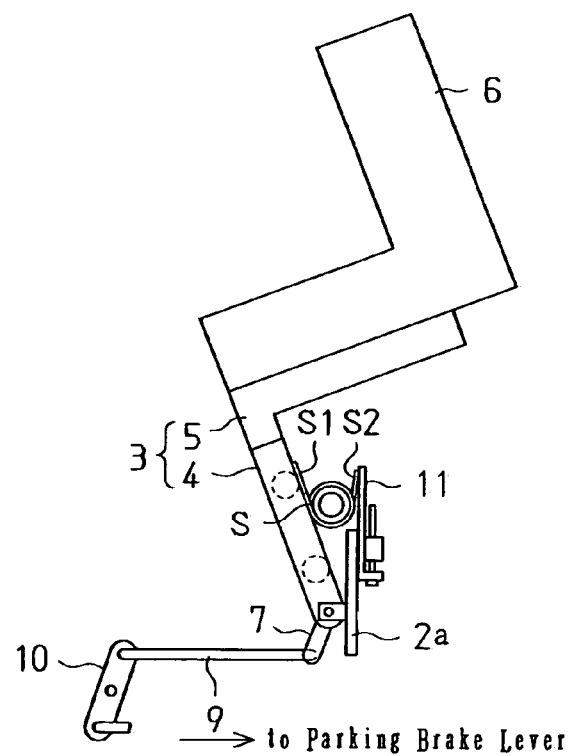
FIG. 2 is a schematic diagram of the seat brake apparatus of FIG. 1.

Referring to FIG. 2, the activation bar 23 is arranged on the upper end portion of the pivot arm 4, that is, a position separated from the pivot axis of the pivot arm 4. Thus, the urging force required to pivot the pivot arm 4 is relatively small. Accordingly, relatively-small torsion springs S may be used.

It should be apparent to those skilled in the art that the present invention may be embodied in many other specific forms without departing from the spirit or scope of the invention. Particularly, it should be understood that the present invention may be embodied in the following forms.

The number of the torsion springs S is not limited to three, and any number of torsion springs may be used.

Instead of having the first end portions S1 of the torsion springs S contact the activation bar 23, the first end portions S1 may directly contact the pivot arm 4.

Although the bolts B1 are inserted through the elongated holes 24 of the contact plate 11 and fastened to the front plate 2a to guide the contact plate 11 upwards, the present invention is not restricted to such structure. Any structure may be employed as long as the contact plate 11 is guided upwards.

The present examples and embodiments are to be considered as illustrative and not restrictive, and the invention is not to be limited to the details given herein, but may be modified within the scope and equivalence of the appended claims.

What is claimed is:

1. A seat brake apparatus for use in a vehicle having a seat, a brake device, and a battery compartment, wherein the seat is arranged above the battery compartment and the brake device is activated when the seat is released from the weight of an operator, the apparatus comprising:
- a pivot member arranged adjacent to the battery compartment to pivotally support the seat;
- a contact plate facing towards the pivot member; and
- a torsion spring for urging the pivot member away from the contact plate, wherein the torsion spring is arranged between the pivot member and the contact plate and has a first end portion that contacts the pivot member and a second end portion that contacts the contact plate, wherein the battery compartment has a side plate, the pivot member is pivotally connected to the side plate, the contact plate is connected to the side plate, and the torsion spring urges the pivot member away from the side plate;
- a moving mechanism for moving the contact plate relative to the side plate; and
- a guiding mechanism for connecting the contact plate to the side plate while guiding the movement of the contact plate relative to the side plate, wherein the moving mechanism and the guiding mechanism cooperate to move the contact plate between a position at which the contact plate compresses the torsion spring and a position at which the contact plate allows the torsion spring to expand relative to the other position.

2. The seat brake apparatus according to claim 1, wherein the contact plate moves between a position at which the second end portion of the torsion spring contacts an upper end of the contact plate and a position at which the first end portion and the second end portion of the torsion spring are located near each other.

3. The seat brake apparatus according to claim 1, wherein:
- the moving mechanism includes a female thread member arranged on the side plate and a position adjustment bolt engaged with the female thread member to move the contact plate along the side plate; and
- the guiding mechanism includes a bolt inserted through an elongated hole, which extends through the contact plate, and is fastened to the side plate.

4. The seat brake apparatus according to claim 1, wherein the contact plate is fastened to a surface of the side plate that is closer to the battery compartment than other surfaces of the side plate.

5. A seat brake apparatus for use in a vehicle having an operator seat, a parking brake device, and a battery compartment, wherein the operator seat is arranged above the battery compartment and the parking brake device is activated when the seat is released from the weight of an operator, the apparatus comprising:
- a front plate arranged adjacent to the battery compartment;
- a support arm for supporting the seat;
- a pivot arm having a basal portion pivotally connected to the front plate and a distal portion connected to the support arm;
- a contact plate connected to the front plate facing towards the pivot arm; and
- a torsion spring arranged between the contact plate and the distal portion of the pivot arm to urge the pivot arm away from the front plate when the seat is released from the weight of the operator, wherein the torsion spring is arranged closer to the distal portion of the pivot arm than the basal portion of the pivot arm.

6. The seat brake apparatus according to claim 5, wherein the torsion spring has a first end portion that contacts the distal portion of the pivot arm and a second end portion that contacts the contact plate.

7. The seat brake apparatus according to claim 6, wherein the first end portion of the torsion spring contacts an activation bar arranged at the distal portion of the pivot arm.

8. The seat brake apparatus according to claim 7, wherein the torsion spring includes a coil portion formed between the first end portion and the second end portion and having an axis parallel to the activation bar.

9. The seat brake apparatus according to claim 6, wherein the contact plate is fastened to a surface of the front plate that is closer to the battery compartment than other surfaces of the front plate.

10. The seat brake apparatus according to claim 5, further comprising:
- a moving mechanism for moving the contact plate relative to the front plate.

11. An industrial vehicle having a brake device, comprising:
- a battery compartment;
- a seat arranged above the battery compartment;
- a seat brake apparatus provided between the seat and the battery compartment, wherein the seat brake apparatus activates the brake device when the seat is released from the weight of an operator, and the seat brake apparatus includes:
  - a pivot member arranged adjacent to the battery compartment to pivotally support the seat;
  - a contact plate facing towards the pivot member; and
  - a torsion spring for urging the pivot member away from the contact plate, wherein the torsion spring is arranged between the pivot member and the contact plate and has a first end portion that contacts the pivot member and a second end portion that contacts the contact plate,
wherein the battery compartment has a side plate, the pivot member is pivotally connected to the side plate, the contact plate is connected to the side plate, and the torsion spring urges the pivot member away from the side plate, wherein the seat brake apparatus further including:
- a moving mechanism for moving the contact plate relative to the side plate;
- a guiding mechanism for connecting the contact plate to the side plate while guiding the movement of the contact plate relative to the side plate, wherein the moving mechanism and the guiding mechanism cooperate to move the contact plate between a position at which the contact plate compresses the torsion spring and a position at which the contact plate allows the torsion spring to expand relative to the other position.

12. The industrial vehicle according to claim 11, wherein the contact plate moves between a position at which the second end portion of the torsion spring contacts an upper end of the contact plate and a position at which the first end portion and the second end portion of the torsion spring are located near each other.

13. The industrial vehicle according to claim 11, wherein the moving mechanism includes a female thread member arranged on the side plate and a position adjustment bolt engaged with the female thread member to move the contact plate along the side plate, and wherein the guiding mechanism includes a bolt inserted through an elongated hole, which extends through the contact plate, and is fastened to the side plate.

14. The industrial vehicle according to claim 11, wherein the contact plate is fastened to a surface of the side plate that is closer to the battery compartment than other surfaces of the side plate.

* * * * *

UNITED STATES PATENT AND TRADEMARK OFFICE
CERTIFICATE OF CORRECTION

PATENT NO. : 7,172,047 B2
APPLICATION NO. : 10/762035
DATED : February 6, 2007
INVENTOR(S) : Hiroyuki Kidokoro It is certified that error appears in the above-identified patent and that said Letters Patent is hereby corrected as shown below:

Column 1, line 50, please delete "contact plate and has" and insert therefore -- contact plate, and has --;

Column 2, line 12, please delete "contact plate and has" and insert therefore -- contact plate, and has --;

Column 3, line 19, please delete "cross section" and insert therefore -- cross-section --; and Column 4, line 41, please delete "relatively-small" and insert therefore -- relatively small --.

Signed and Sealed this

Sixth Day of October, 2009

David J. Kappos
*Director of the United States Patent and Trademark Office*